(12) United States Patent
Warrier et al.

(10) Patent No.: US 8,167,191 B2
(45) Date of Patent: May 1, 2012

(54) HIGH TEMPERATURE SEAL FOR JOINING CERAMIC COMPONENTS SUCH AS CELLS IN A CERAMIC OXYGEN GENERATOR

(75) Inventors: Sunil G. Warrier, Middletown, CT (US); Richard S. Bailey, Somers, CT (US); Willard H. Sutton, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/164,793

(22) Filed: Jun. 21, 2011

(65) Prior Publication Data

US 2011/0248073 A1    Oct. 13, 2011

Related U.S. Application Data

(62) Division of application No. 10/702,010, filed on Nov. 5, 2003, now Pat. No. 7,989,086.

(51) Int. Cl.
*B23K 31/02*    (2006.01)

(52) U.S. Cl. .................. 228/121; 228/122.1; 228/124.6

(58) Field of Classification Search .................. None
See application file for complete search history.

(56) References Cited

U.S. PATENT DOCUMENTS

| | | | |
|---|---|---|---|
| 3,432,913 A * | 3/1969 | Hughes et al. | 228/121 |
| 4,225,262 A | 9/1980 | Koop et al. | |
| 4,342,632 A | 8/1982 | Heim et al. | |
| 4,678,868 A * | 7/1987 | Kraska et al. | 174/152 GM |
| 4,763,828 A * | 8/1988 | Fukaya et al. | 228/124.1 |
| 4,801,067 A * | 1/1989 | Kondo et al. | 228/123.1 |
| 4,980,239 A | 12/1990 | Harada et al. | |
| 5,033,666 A * | 7/1991 | Keusseyan et al. | 228/122.1 |
| 5,744,252 A * | 4/1998 | Rasky et al. | 428/594 |
| 6,050,478 A * | 4/2000 | Saint-Antonin et al. | 228/121 |
| 6,315,188 B1 | 11/2001 | Cadden et al. | |
| 6,331,194 B1 | 12/2001 | Sampayan et al. | |
| 6,528,123 B1 | 3/2003 | Cadden et al. | |
| 6,612,175 B1 | 9/2003 | Peterson et al. | |
| 6,616,032 B1 * | 9/2003 | Gasse et al. | 228/248.1 |
| 6,843,406 B2 | 1/2005 | Yang et al. | |
| 7,380,698 B2 * | 6/2008 | Meyer et al. | 228/194 |
| 2006/0016371 A1 * | 1/2006 | Yadav | 106/400 |

FOREIGN PATENT DOCUMENTS

EP    0922682 A1    6/1999

* cited by examiner

*Primary Examiner* — Kiley Stoner
(74) *Attorney, Agent, or Firm* — Carlson, Gaskey & Olds PC

(57) ABSTRACT

A multi-layer seal arrangement includes a dissolution barrier between a braze alloy and a ceramic component. The inventive seal is useful for joining a ceramic component to another ceramic component or a metal component, for example. In one example, the braze comprises a gold alloy and the dissolution barrier comprises a layer of alumina on the order of 2-3 microns thick. A titanium wetting layer is provided between the alumina layer and the alloy. A metallization layer provided between the dissolution barrier and the ceramic component in one example comprises a layer of gold between two thin layers of titanium. In one particular example, a platinum mesh is included with the gold of the braze alloy to control braze flow during the brazing operation.

6 Claims, 1 Drawing Sheet

HIGH TEMPERATURE SEAL FOR JOINING CERAMIC COMPONENTS SUCH AS CELLS IN A CERAMIC OXYGEN GENERATOR

CROSS-REFERENCE TO RELATED APPLICATIONS

This application is a divisional application of U.S. patent application Ser. No. 10/702,010 filed Nov. 5, 2003, now U.S. Pat. No. 7,989,086.

BACKGROUND OF THE INVENTION

1. Field of the Invention

This invention generally relates to a sealing arrangement for joining at least one ceramic component to another component. More particularly, this invention relates to a multilayer seal arrangement for establishing high temperature seals where at least one ceramic component is joined to another component.

2. Description of the Related Art

There are various structures that are made from ceramic components, which are joined together. In most circumstances, a reliable seal must be established between the ceramic components for the arrangement to work as intended. Conventional techniques for joining ceramic-to-ceramic or ceramic-to-metal components involve such practices as active-metal brazing, which consists of a single braze alloy comprised of a base metal (such as silver or gold) and a chemically reactive metal (such as titanium, zirconium, or hafnium). The base metal provides the bulk of the braze structure, which is usually ductile, while the active metal promotes interfacial wetting and bonding between the components during the brazing process.

A significant challenge arises in the case of a ceramic oxygen generator, where a plurality of individual cell components is joined together. A cell consists of a thin solid ceramic electrolyte that is coated on each side with a gas permeable (porous) electrode material such as platinum. The ceramic electrolyte is also sandwiched between and bonded to two interconnecting plates. These plates, or interconnects, make electrical contact with the electrodes, and also contain channels that direct the flow of the different gases over the electrodes. The brazing material is in the shape of a gasket, which forms a non-contacting boundary around the electrodes, and is used to join the electrolyte surfaces to the interconnect plates. Each cell, and the stacked cells, must be reliably sealed and bonded together in order for them to withstand the temperatures associated with oxygen generation and with other operating conditions. Another requirement of the brazing gasket material, is that it must compress sufficiently in the presence of a liquid phase during the brazing process so that the interconnect plates will make good electrical contact with each electrode.

In conventional brazing processes, which typically use a single active-metal brazing alloy, detrimental interfacial reactions can occur and be very difficult to control, depending on the exact materials to be joined. For example, extensive reactions have been observed in zirconia/active-metal braze interfaces. During the brazing process, the active metal migrates to and chemically reacts with the zirconia surface. This reaction causes pitting and stress concentrations in the zirconia electrolyte and causes premature failure. Thus for ceramic oxygen generators and other electrochemical devices (such as solid oxide fuel cells), the challenge is in establishing an appropriate seal without compromising the material at the sealed interfaces.

It is therefore necessary to control the extent of the interfacial reactions so that they provide sufficient wetting and bonding, but at the same time do not degrade the properties of the ceramic components being joined. This invention addresses that need, while avoiding the shortcomings and drawbacks of the prior art.

Also addressed is one prior art approach where a ceramic stopper has been incorporated into the braze arrangement in order to control the flow of the braze alloy during the brazing operation. The stopper allows for greater latitude in the brazing temperature by confining the flow of the alloy to the seal area and thereby preventing electrical shorting to the electrodes.

SUMMARY OF THE INVENTION

In general terms, this invention is a multi-layered seal and process for joining a ceramic component to another component.

Each layer in the seal is designed to perform a specific function. By selecting distinct layers of different composition, thickness, and sequence in the braze arrangement and by controlling the processing conditions, it is now possible to meet all of the sealing and bonding requirements for joining and assembling cells in high-temperature electrochemical devices. Conventional brazing techniques using a single braze alloy are not capable of meeting these requirements.

One example sealing arrangement designed according to this invention includes a braze alloy and a dissolution barrier between the braze and the ceramic component.

The specific braze material arrangement and processing conditions are dictated by the operating requirements of the device and by the materials of construction. One example device addressed in this invention is based on an advanced ceramic oxygen generator with cells comprised of zirconia electrolytes (stabilized with 8-mole % $Y_2O_3$), porous platinum electrodes, and Met-X (Cr-5Fe-1$Y_2O_3$) interconnect plates and manifolds.

The seal requirements for such device include providing a gas-tight seal between the cell layers and joining (bonding) the cells together and to the manifolds. The seal must also be thermally, chemically and mechanically compatible with cell constituents; resist degradation due to thermal cycling and long term service life; resist corrosion in an oxygen environment at elevated temperatures; and control braze alloy flow during processing to attain good electrical contact between interconnect plates and electrodes and still be confined to the seal area One sealing arrangement designed according to this invention includes a gold brazing alloy (such as Gold ABA, Au-3Ni-0.6Ti) with a melting range of 1003°-1030° C., and a dissolution layer of $Al_2O_3$ which is sandwiched between layers of Ti on one side and Ti/Au/Ti on the other. The composition and quantity (thickness) of each layer is tailored to control the chemical reactions and diffusion of species at each of the layer interfaces and at the interfaces of the components to be joined. As a result, the chemical composition of the component interfaces, and the composition gradients across the joint (seal) thickness can be precisely controlled.

One example includes the gold alloy ABA because it is sufficiently fluid at the brazing temperature and is a strong, ductile seal. The ABA alloy wetted the alloy, Met-X, and did not degrade it, so that a dissolution barrier was not necessary at the interface. While the ABA alloy can wet and bond to the $ZrO_2$ electrolyte, it also may cause degrading interfacial reactions with the $ZrO_2$ Thus an $Al_2O_3$ dissolution layer preferably is an addition to the seal arrangement. $Al_2O_3$ is not wetted by gold, nor is it partially wetted by the ABA alloy. Therefore, a metallizing (or wetting) layer of Ti preferably is deposited on each side of the $Al_2O_3$ layer. Between the $Ti/Al_2O_3/Ti$ layers and the $ZrO_2$ electrolyte, an additional thin layer of pure gold (mp.1064° C.) and Ti is preferred to promote a solid-state bonding of the multi-layer braze to the zirconia. This type of bonding eliminates deleterious liquid phase reactions at the $ZrO_2$ interface. The liquid phase that forms during the brazing operation occurs only in the gold ABA alloy at the Met-X interface.

In some examples, a wetting layer is provided between the braze alloy and the dissolution barrier. Titanium is used as one example wetting layer. A metallization layer between the dissolution barrier and the seal interface of the ceramic component is provided on the other side of the dissolution barrier in some examples. One particular metallization layer comprises titanium and gold layers. In the absence of a liquid phase, the titanium promotes solid state bonding, and hence is considered as a metallization phase. In the presence of a liquid, titanium is considered as a wetting phase or promoter.

One method of this invention establishes the seal between the ceramic component and the other selected component, which may be ceramic or metal for example, by brazing at a temperature in the range from 1050° C. to 1060° C. for a time of approximately five minutes. In one example, a unilateral pressure of 14kPa (2 psi) is applied during the brazing operation.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
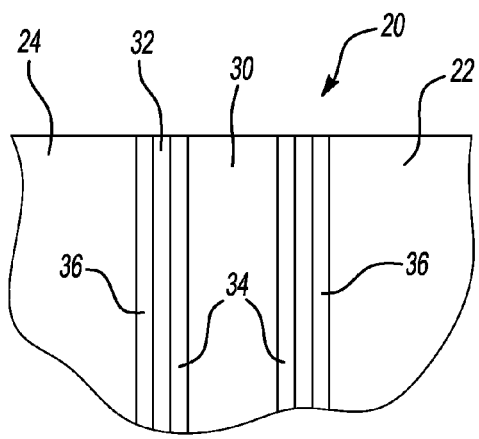
FIG. 1 schematically illustrates a multi-layer seal arrangement designed according to this invention.

FIG. 1 schematically illustrates the seal arrangement 20 between two components 22 and 24 (partially shown). In one example, the components 22 and 24 are cells of a ceramic oxygen generator. The inventive seal arrangement is particularly useful for bonding ceramic components to other ceramic or metal components. The inventive seal establishes a reliable, sealed interface between a ceramic component and the other component without compromising the integrity of the ceramic component at the sealed interface.

The inventive arrangement includes a braze alloy layer 30 and a dissolution barrier 32 between the braze alloy 30 and the components 22 and 24. In one example, the dissolution barrier comprises a layer of alumina. Other example dissolution layers include oxides based on Ca, Mg, Si or all compositions such as spinel or mullite.

In the example of FIG. 1, a wetting layer 34 is provided between the braze alloy 30 and the dissolution barrier 32. A metallization layer 36 also is provided between the dissolution barrier 32 and the ceramic component 22.

The inventive multi-layer seal preferably comprises a multi-layer coating that is applied to the appropriate component or components prior to a brazing operation. The dissolution barrier 32 prevents direct contact between the braze and the ceramic component thereby eliminating excessive reaction at the surface of the component. The layers of wetting and bonding (metallizing) materials are provided at the various locations schematically illustrated so that a strongly bonded joint is produced.

Figure 2:
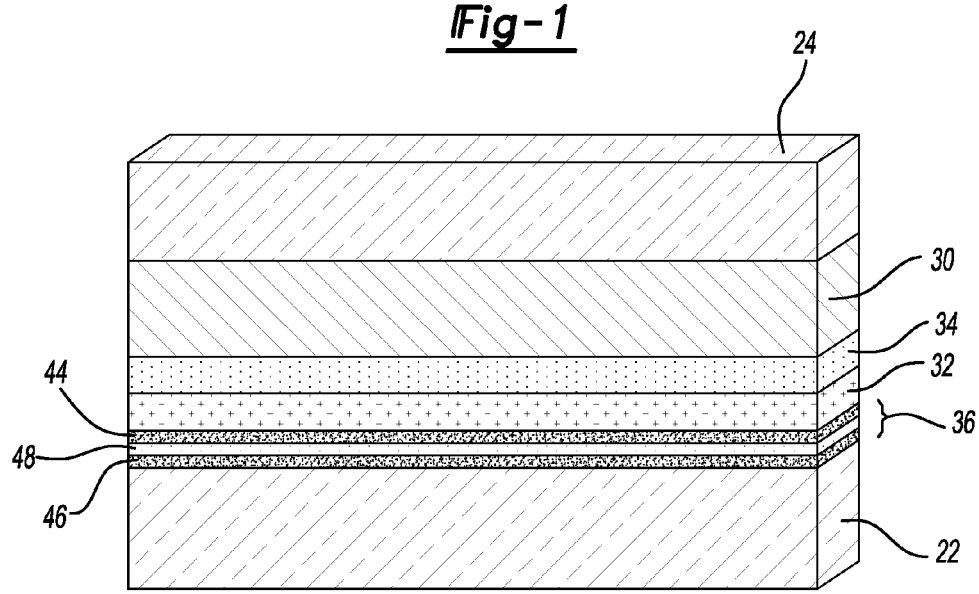
FIG. 2 schematically illustrates a particular example of a multi-layer seal designed according to this invention.

FIG. 2 schematically illustrates one example seal arrangement 20 where layers are applied to the ceramic component 22 surface that will be sealed to an adjacent metal (MET-X) component 24. In this example, the component 22 comprises a Zirconia electrolyte. In this example the braze alloy gold ABA 30 is in contact with the MET-X component 24. In this example the dissolution barrier 32 comprises a layer of alumina ($Al_2O_3$). The wetting layer 34 comprises titanium. A metallization layer 36 in this example comprises a layer of titanium 44 and 46 on opposite sides of a layer of pure gold 48.

In one particular example, the multi-layer coating has the following dimensions: the gold ABA layer 30 is 150 microns thick, the metalization layer 34 of titanium is 4 microns thick, the dissolution barrier of alumina 32 is in the range of 2 to 3 microns thick, the titanium layer 44 is 0.1 microns thick, the gold layer 48 is 1 micron thick and the titanium layer 46 is 0.1 microns thick.

In one use of this example coating, the brazing operation is performed at a temperature of 1050° C. to 1060° C. for approximately five minutes applying a unilateral pressure of approximately 14 kPa (2 psi). At this particular brazing temperature range, pure gold is near its melting point. The reaction produced by the gold with the titanium and zirconia produces a strong bond with minimal interfacial reaction between the zirconia and the gold layer.

The use of the alumina dissolution barrier minimizes the reaction at the braze/zirconia interface. Alumina has a lower coefficient of thermal expansion than zirconia. Accordingly, compressive stresses are developed in the alumina layer during cool down from the elevated processing temperature. Such compressive stresses must be overcome before cracking occurs. Therefore, crack initiation and propagation is less likely to originate from the alumina layer and the resulting interface has less reaction in the zirconia.

In one example, using the inventive coating has provided shear strengths as high as 33.6 MPa (4.8 ksi). With the inventive arrangement, the zirconia electrolyte is not severely degraded.

The selected composition and seal arrangement of FIG. 2 is tailored to seal specific cell having a ceramic ($ZrO_2$) electrolyte and a metallic (Met-X) interconnect. Seals designed according to this invention can be applied to other multi-cell electrochemical devices, such as other compositions of ceramic generators, fuel cell components or other multi-layer electronic devices. Accordingly, different materials, dimensions and temperatures or pressures may be used.

For example, the active metal Ti may be replaced by Hafnium (Hf) or

Zirconium (Zr), which could be used as layers, coatings or alloying additions to the braze alloys. The gold and gold alloys described above may be replaced with silver alloy brazes, which may be useful for similar types of devices with lower temperature service applications. The platinum mesh 50 may be replaced with Rh, Pt/Rh, or Pt alloy meshes. The interconnect alloy (Met-X) can be replaced by other oxidation-resistant alloys or electrical conductors such as lanthanum chromate, lanthanum calcium manganate (LCM), or lanthanum strontium manganate (LSM). The dissolution layer $Al_2O_3$ can be replaced with other oxides based on Ca, Mg, Si and Al compositions (such as spinel or mullite).

Although the pressure applied during brazing in the above example was 14 kPa, other examples include using pressure within a range from 0 to 200kPa (28 psi).

Figure 3:
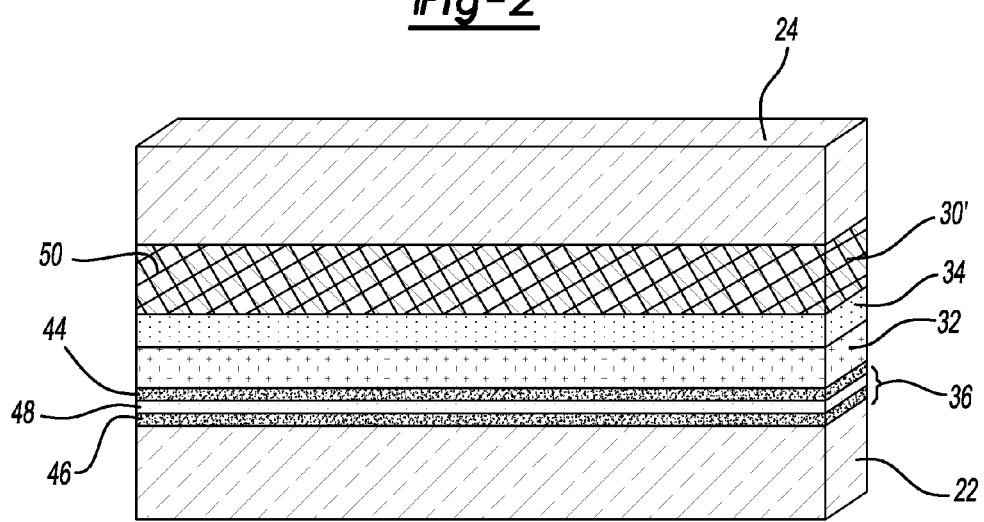
FIG. 3 schematically illustrates another example multi-layer seal arrangement designed according to this invention.

Braze flow control is an important parameter in the fabrication of some devices that include ceramic components such as ceramic oxygen generators. When fabricating multiple celled ceramic oxygen generators, it is critical that the braze flow does not overflow from the seal area and short circuit the electrical circuit within the cell. The inventive approach includes braze flow control in one example by providing a platinum mesh 50 as part of the multi-layer coating in contact with the braze alloy. FIG. 3 schematically illustrates an example embodiment having a platinum mesh layer 50 within the gold ABA layer 30. The braze alloy layer 30 exhibits excellent wetting properties on platinum. The platinum mesh 50 confines the flow of the braze to within the porosities of the platinum mesh. With a platinum mesh layer 50 the braze stays within the intended seal region so that it does not make electrical contact with the platinum electrode (not shown).

The illustrated example in FIG. 3 preferably has the same materials and dimensions (i.e., thicknesses) as those shown in FIG. 2 and described above.

Utilizing a platinum mesh 50 as part of the multi-layer coating increases the control of braze flow but may tend to reduce the strength of the seal. In one example, the shear strength of a seal established including a platinum mesh 50 was on the order of 14 MPa (2 ksi). Any sacrifice of shear strength, however, may be weighed against the benefits of tightly controlling braze flow during the brazing operation. Given this description, those skilled in the art will be able to select what is the best solution for their particular needs.

The inventive approach provides the ability to precisely control reactions between ceramics like zirconia and a braze alloy. The invention produces brazed joints with high bond strengths and minimal degradation of the ceramic. The invention allows for a wide variety of applications where at least one ceramic component is brazed and joined to another ceramic component or to a metal component, for example.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of sealing an interface between a ceramic component and at least one other component, comprising:
    establishing a dissolution barrier between a braze alloy and the ceramic component;
    applying a metallization layer between the ceramic component and the dissolution barrier;
    applying a wetting layer between the dissolution barrier and the braze alloy;
    heating the ceramic component, the braze alloy and the dissolution barrier to a temperature in the range from 1050° C. to 1060° C. for a period of approximately five minutes; and
    applying a pressure from within the range from about 0 kPa to about 200 kPa (28 psi).

2. The method of claim 1, including applying a pressure of approximately 14 kPa (2 psi).

3. The method of claim 1, wherein the braze alloy comprises gold, the wetting layer comprises titanium, the dissolution barrier comprises alumina and the metallization layer comprises gold and titanium.

4. The method of claim 3, wherein the gold in the braze alloy is approximately 150 microns thick, the titanium in the wetting layer is approximately 4 microns thick, the alumina in the dissolution barrier is in the range from about 2 to 3 microns thick, the gold in the metallization layer is approximately 1 micron thick and the titanium in the metallization layer comprises two layers of titanium that are each approximately 0.1 microns thick.

5. A method of sealing an interface between a ceramic component and at least one other component, comprising:
    establishing a dissolution barrier between a braze alloy that comprises gold and the ceramic component;
    providing a platinum mesh in the vicinity of the gold;
    heating the ceramic component, the braze alloy and the dissolution barrier to a temperature in the range from 1050° C. to 1060° C. for a period of approximately five minutes; and
    applying a pressure from within the range from about 0 kPa to about 200 kPa (28 psi).

6. The method of claim 5, including applying a pressure of approximately 14 kPa (2 psi).

* * * * *